3,523,917
ORGANIC POLYISOCYANATE GELS AND URETHANE POLYMERS THEREFROM
Eugene A. Dickert, Buffalo, and Hartley A. Silverwood, Fairport, N.Y., assignors to Allied Chemical Corporation, New York, N.Y., a corporation of New York
No Drawing. Filed July 7, 1967, Ser. No. 651,704
Int. Cl. C08g 22/18, 22/46, 41/04
U.S. Cl. 260—2.5      12 Claims

ABSTRACT OF THE DISCLOSURE

The organic polyisocyanate gels of this invention, which are less hazardous to use than liquid isocyanates are prepared by mixing a polyisocyanate with a minor amount of polyvinyl chloride. In the gel state, the polyisocyanate is stable with respect to active hydrogen containing compounds, but the polyisocyanate is activated when the gel is warmed or is vigorously agitated. This invention includes one-can compositions of polyisocyanate gel and active hydrogen containing substances. The polyisocyanate gels and one-can compositions are particularly useful for the preparation of polyurethanes.

---

This invention relates to compositions comprising polymerizable materials. More particularly, it relates to compositions in gel form comprising organic polyisocyanates and polyvinyl chloride and to processes for the preparation thereof. This invention also concerns compositions containing the organic polyisocyanate gels and an active hydrogen compound, particularly compositions useful for the preparation of polyurethanes; and in addition, this invention concerns a novel method for preparing polyurethanes using the instant polyisocyanate gels.

Organic polyisocyanates such as tolylene diisocyanates, 4,4'-methylene-bis-(phenyl isocyanate), polymethylene polyphenyl-isocyanates, hexamethylene diisocyanate and the like are well known commercially available intermediates for the production of urethane polymers. The reaction of organic polyisocyanates with polyfunctional active hydrogen containing substances, such as polyols, polyamines, and the like, in the optional presence of catalysts, surfactants, blowing agents, fillers, etc., yields a variety of useful urethane polymers both cellular and non-cellular, rigid and flexible. Urethane polymers are widely used as cushioning materials, structural members, insulating materials, synthetic rubber, textile fibers, and coatings.

Organic polyisocyanates are highly reactive in character and present problems in shipment and storage and also in use.

Liquid organic diisocyanates, particularly, have presented problems arising from their reactivity and toxicity. Organic isocyanates are sensitive to moisture and ordinarily must be handled in closed systems. Tolylene diisocyanates and hexamethylene diisocyanate, in particular, possess relatively high vapor pressures, and thus these reagents are hazardous to the health of personnel who must be well protected, by goggles, masks, and protective clothing when handling these chemicals. On hot humid days, these problems are magnified.

It is a principal object of this invention to provide novel compositions comprising organic polyisocyanates in stable form.

Another object is to provide novel compositions comprising liquid organic polyisocyanates in the stable gel state.

A specific object is to provide compositions comprising tolylene diisocyanates and polyvinyl chloride in the gel state which are stable and relatively non-hazardous.

A further object is to provide stable mixtures of organic polyisocyanate gels and active hydrogen containing compounds which mixtures can be stored for indefinite periods at ambient temperatures without substantial reaction.

A still further object of this invention is the provision of a novel procedure for preparing urethane polymers from organic polyisocyanate gels, and a further specific object of this invention is the provision of a method for preparing urethane polymers which substantially eliminates the health hazards associated with the handling of organic polyisocyanates.

Other objects and advantages accruing therefrom will be obvious from the following description of our invention.

We have made the surprising discovery that compositions comprising an organic polyisocyanate in admixture with about 3 to about 12 parts by weight of polyvinyl chloride per 100 parts by weight of the organic polyisocyanate are stable gels at ambient temperature. The polyisocyanate gels of this invention do not flow at ambient temperatures and at temperatures up to about 35° C., do not react to a substantial degree in interfacial contact with active hydrogen containing substances, and are relatively non-hazardous.

Such gels, surprisingly, can be stored for extended periods in the atmosphere with only superficial attack by the humidity in the atmosphere. Further, when the gels are heated to about 40° C. or above, the isocyanate component reverts to the liquid state, and in the liquid state the isocyanate component reacts in the normal manner when mixed wtih active-hydrogen containing materials.

These novel gels permit the handling and transferance of the polyisocyanates without danger of spillage which would occur should the container break or leak. Further, polyisocyanates, such as methylene-bis-(phenylisocyanate), undistilled toluene diamine phosgenation products and polymethylene polyphenyl isocyanates, often develop solids on storage, which tends to settle to the bottom of the container and interfere with the transfer of the isocyanate. Such solids are held in suspension in the gel state according to this invention and thus, the uniformity of the isocyanate composition is preserved indefinitely.

Even more surprising is our further discovery that compositions comprising organic polyisocyanate gel and an active-hydrogen containing substance can be stored at ambient temperatures for indefinite periods of time without substantial reaction. Further, according to our invention, compositions comprising the polyisocyanate gel and an active-hydrogen containing compound are stable at normal ambient temperatures, i.e. about 20° to 30° C., but revert to the reactive state upon being heated to a temperature of 40° C. or above, and also upon being vigorously agitated at normal temperatures.

Thus, in accordance with particular aspects of this invention, a novel composition comprising the polyisocyanate gel and an active hydrogen containing material, preferably an organic compound containing an active hydrogen, and particularly a polymeric material such as a polyamide, polyamine or polyol including polyester polyol, polyalkylene ether polyol, polyamide polyol and the like, are placed in a single container and stored until used. Such one-can compositions are particularly useful for the storage and shipment of the ingredients employed for the preparation of polyurethanes. It has been found that by employing the polyisocyanate gels of this invention, all of the ingredients necessary for the preparation of a urethane polymer can be included in a single package wherein the reagents remain stable and unreacted and further, in accordance with our invention the preparation of the polyurethane is effected, when desired, by the application of vigorous agitation to the mixture. Reaction to form polyurethane can also be effected by the application of gentle heat.

Thus, the active-hydrogen containing phase of one-can compositions of this invention which are to be used for the preparation of polyurethanes can contain blowing agents, such as water and/or fluorocarbons, catalysts, surfactants, fillers and the usual conventional components of polyol premixes used in the preparation of urethane polymer.

By such procedures, cellular and non-cellular urethane polymer compositions are packaged and the corresponding polymer products prepared when desired.

The novel polyisocyanate gels of this invention comprise an organic polyisocyanate, preferably an organic diisocyanate and especially a liquid organic diisocyanate. Particularly useful gels are prepared from tolylene diisocyanates and from undistilled toluene diamine phosgenation products. Examples of the organic polyisocyanates used in our invention are:

ethylene diisocyanate
tetramethylene dissocyanate
hexamethylene diisocyanate
m-phenylene diisocyanate
2,4-tolylene diisocyanate
2,6-tolylene diisocyanate
4,4'-methylene-bis-(phenylisocyanate)
4,4'-methylene-bis-(cyclohexylisocyanate)
2,2'-p-xylylene diisocyanate
2,2'-m-xylylene diisocyanate
benzene-1,3,5-triisocyanate
undistilled toluene diamine phosgenation products prepared as described in U.S. Pats. 3,215,362 and 3,316,286 of Kaplan, the disclosures of which are incorporated herein by reference.
polymethylene-polyphenyl-polyisocyanates such as those disclosed in U.S. Pat. 2,683,730 of Seeger and Fauser.

Mixtures of these and equivalent polyisocyanates are contemplated by this invention also. For example, the undistilled toluene diamine phosgenation products used in the gel compositions of this invention generally have an amine equivalent between 98 and 120; however, if desired, such undistilled phosgenation products may be mixed with 2,4- and 2,6-tolylene diisocyanates to reduce the amine equivalent, i.e. to reduce the functionality of the isocyanate component. Thus, the instant compositions are adaptable for many purposes as will be obvious to those skilled in the art.

The polyvinyl chloride which is admixed with the organic polyisocyanate, in minor amount, to produce the gelled composition can be readily available homopolymer or in the form of an interpolymer of vinyl chloride and a compound of polymerizable olefinic character which is or is not present in preponderating amount. Such olefinic compounds are exemplified by vinyl esters, such as vinyl acetate, styrene, and the esters, nitriles, and amides of acrylic, methacrylic, fumaric and maleic acids. Mixtures of these and other polyvinyl chloride polymers are also contemplated.

The amount of polyvinyl chloride required to produce an organic polyisocyanate gel in accordance with this invention varies according to the particular polyisocyanate(s) used and with the degree of firmness desired for the gelled composition. In general, satisfactory results are obtained by admixing about 3 to about 12 parts by weight of polyvinyl chloride with 100 parts by weight of organic polyisocyanate. Preferably, about 4 to 10 parts of polyvinyl chloride are used to produce gels which possess sufficient strength to resist movement, such as occurs on inversion of liquid composition.

The novel polyisocyanate gels of this invention comprising an organic polyisocyanate admixed with polyvinyl chloride can be prepared in a number of ways. For example, the polyvinyl chloride may be dissolved in the organic polyisocyanate by gentle heating and agitating of the mixture. Usually the polyisocyanate polyvinyl chloride mixture is warmed to a temperature of about 30° to 60° C. to prepare the gel. Higher temperatures may be used but are undesirable due to the toxic isocyanate fumes produced at elevated temperatures. Thereafter, the mixture may be cooled to the gel state or, if desired, poured into suitable molds or containers and cooled therein to the gel state. Alternatively, the polyisocyanate gel can be prepared by mixing solutions of polyvinyl chloride and polyisocyanate. The gel product is then obtained by evaporation of the solvent at moderate temperature and preferably in vacuo.

The novel one-can compositions of this invention which comprise the instant polyisocyanate gel and an active hydrogen containing component are prepared by superimposing a layer of the active hydrogen containing material on a layer of the polyisocyanate gel and then storing the package until it is desired to carry out the reaction between these materials.

The one-can compositions of this invention are particularly directed to the preparation of polyurethanes especially cellular polyurethanes, and therefore, the active hydrogen containing component is preferably a polyol. The polyols used for the preparation of polyurethanes are well known in the art and many are readily available in commercial quantities. Thus, according to our invention the active hydrogen containing component of the one-can composition can be polyester polyols such as the reaction products of adipic acid, phthalic acid and trimethylol propane, and the reaction products of phthalic acid and a mixture of propylene glycol and glycerine, polyestamides, wherein part to all of the polyol compound of the just described polyester polyol has been replaced by an amine derivative such as diethylenetriamine, polyamide polyols such as the reaction product of phthalic acid and ethanol amine, and polyalkylene ether polyols. The polyalkylene ether polyols which are preferred in this invention are believed to have essentially the following general formula:

wherein R is the residue of a polyol of the class exemplied below; $R_1$ is hydrogen, methyl or ethyl; A is hydrogen, $(CH_2CH_2O)_mH$, $—(CH_2CH_2CH_2O)_mH$, or

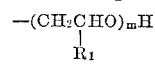

where $m$ is the integer 1, 2, or 3; $x$ is an integer from about 5 to about 25; $y$ is an integer of 2 to 6; and $z$ is an integer of 0 to 1. Such polyether polyols can be obtained in a well known manner by condensation of an alkylene oxide such as 1,2-propylene oxide, 1,3-propylene oxide, ethylene oxide or mixtures thereof, with polyhydric alcohols such as ethylene glycol, propylene glycol, dipropylene glycol, tetramethylene glycol, trimethylol propane, sorbitol or mixtures thereof, in the presence of a catalyst or initiator such as a trialkylamine, e.g., trimethylamine, or an inorganic base, e.g., potassium hydroxide, or a metal halide, e.g., boron trifluoride.

A general discussion of these preferred polyols, their preparation and utilization in the preparation of urethane structures can be found in Saunders et al., Polyurethanes, Chemistry and Technology, Part I. Chemistry, High Polymers Vol. XVI, Interscience Publishers, 1962.

The urethane structures prepared in accordance with this invention may be cellular in character and if so, are prepared in the presence of a blowing agent. This may be water which by in situ reaction with the isocyanate component produces carbon dioxide. The blowing agent may also be a non-reactive low boiling organic liquid such as methylene chloride or more especially a fluorinated hydrocarbon ("Fluorocarbons") as is well known in this art.

The fluorocarbons and methylene chloride are characterized by being liquids or gases at normal temperatures and pressures, and by boiling at or below the temperatures generated by the urethane formation reaction, generally at or below about 110° C. As typical examples of the fluorocarbon blowing agents, the following are mentioned: monochlorotrifluoromethane, 1, 2, 2 - trifluoroethane, 1 - chloro - 1, 1, 2 - trifluoroethane, 1 - chloro-2, 2 - difluoroethane, 1 - chloro - 1 - fluoroethane, 1, 1 - dichloro - 2, 2 - difluoroethylene and 1, 2-dichloro-1,2-difluoroethane. Mixtures of these and equivalent fluorocarbons can be used, also.

In accordance with what is now conventional practice in the urethane art, the polyisocyanate-polyol mixture is reacted in the presence of various adjuvants such as activators and/or catalysts, dispersing agents or surfactants or emulsifiers, pigments, fillers, anti-oxidants, fire retardant agents and the like.

Among the typical catalysts and/or activators used in this connection the following are mentioned:

Tertiary amines such as triethylamine N-methyl-morpholene, triethylenediamine, N,N,N',N'-tetramethyl-1,3-butanediamine, soya lecithin;

Organo-tin compounds of the following formula:

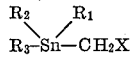

wherein $CH_2X$ represents hydrocarbon alkane radicals of 1 to about 18 carbons. $R_1$, $R_2$ and $R_3$ represent hydrocarbon alkane radicals of 1 to about 18 carbons, hydrogen, halogen, or hydrocarbon acyloxy radicals, $R_1$, $R_2$ and $R_3$ being alike or different, and further, two members of the group $R_1$, $R_2$ and $R_3$, together may be oxygen or sulfur. Representative members of this class include the following:

Tetramethyltin
Tetra-n-butyltin
Tetra-n-octyltin
Di-n-butyltin dichloride
Dilauryltin difluoride
2-ethylhexyltin triiodide
Di-n-octyltinoxide
Di-isobutyltin-bis-(monobutylmaleate)
Di-n-butyltin diacetate
Di-2-ethylhexyltin-bis-(2-ethylhexanoate)
Tri-n-butyltin acetonate
Dibutyltin distearate
Organic tin salts such as stannous octoate
and stannous oleate.

These catalysts or accelerators or activators can be used alone or in admixture with one or more of the several types of substances exemplified above.

Surfactants, dispersing, or emulsifying agents conventionally used in this art include polyethylene phenol ethers, blends of polyalcohol carboxylic acid esters, soluble sulforates, siloxane-oxyalkylene block copolymers, and the like. The preferred adjuvants of this group, in the present instance, are the siloxane-oxyalkylene block copolymers, a typical member of which has the following general formula:

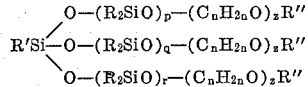

where R, R', and R'' are $C_1$–18 alkyl radicals; $p$, $q$, and $r$ are integers from 2 to 15; and $-(C_nH_{2n}O)_z$ is a polyalkylene block, which is preferably a polyethylene block, containing from 10 to 15 of each polyethylene unit. Products of this type are disclosed in Belgium Pats. 582,362–3. Such siloxane-oxyalkylene block copolymers are available commercially. One such product being offered under the trade designation of "Silicon L–5310" in which in the above formula $R=CH_3$, $R'=C_2H_5$, $R''=C_4H_9$, $p=q=r=7$ and the block, $-(C_nH_{2n}O)_z$ is a polyethylene-polypropylene block containing about 30 units of each polyoxyalkylene moiety.

In accordance with a preferred mode of preparing polyurethane by means of this invention, a gel prepared from 100 parts by weight of a mixture of 80% 2,4 and 20% 2,6-tolylene diisocyanate and about 6 parts of polyvinyl chloride is broken into lumps and placed in a receptacle and covered with a premix consisting of 100 parts of a polyol, 1.5 parts of a silicone surfactant, about 3 parts of an amine catalyst and 40 parts of a fluorocarbon blowing agent. The receptacle is covered and may be stored, at ambient temperature or below, for an indefinite period. Substantially no reaction occurs between the organic polyisocyanate and the polyol in the mixture during the storage period. When desired, the reaction is induced by inserting an agitator and vigorously agitating the composition until the mass "creams," usually within one minte, after which the foaming mass can be poured into a suitable form and further processed in the conventional manner.

The following examples describe specific embodiments of this invention and illustrate the best method contemplated for carrying it out, but they are not to be interpreted as limiting the invention to all details hereof, since changes can be made wihout departing from the scope or spirit of the invention. Parts and percentages are by weight and temperatures are in degrees centigrade.

EXAMPLE 1

Preparation of polyisocyanate gel

To 100 parts of a mixture of 80% 2,4-tolylene diisocyanate and 20% 2,6-tolylene diisocyanate, 2 parts of a low molecular weight polyvinyl chloride resin having an intrinsic viscosity of 0.70 stoke at 25° C. and a specific gravity of 1.4, commercially available as "Vygen 65." The mass was heated on a hot plate to about 50° C. and gently stirred until a clear solution was obtained. The solution was permitted to stand, covered to exclude atmospheric moisture, until it had cooled to ambient temperature. The resulting solution was slightly more viscous than the tolylene diisocyanate solvent.

The above described experiment was repeated using instead of 2 parts of polyvinyl chloride, 4, 6, and 10 parts of polyvinyl chloride (PVC). The respective solutions set to gels on cooling to ambient temperature, the mixture containing 4 parts of PVC became a firm gel; the mixture containing 6 parts of PVC became a thicker gel; and the mixture containing 10 parts of PVC became a very firm gel.

This experiment indicates that more than 2% of PVC is needed to provide a gel with tolylene diisocyanate.

EXAMPLE 2

Preparation of polyisocyanate gel

The following experiment was carried out to compare the stability of the gels of the present invention with that of an organic polyisocyanate.

To 1000 parts of an 80–20 mixture of 2,4 and 2,6-tolylene diisocyanates, 60 parts of polyvinyl chloride (Vygen 65) were added. The mass was agitated and heated on a hot plate until a clear solution was obtained. The warm solution was poured into bottles, placing about 200 parts of solution in each bottle, the bottles covered to exclude moisture, and the contents permitted to cool to ambient temperature. A firm gel resulted.

(A) Stability to moisture in atmosphere

A bottle containing about 200 parts of the mixed tolylene diisocyanates and a similar bottle containing the gel prepared as described above were permitted to stand, uncapped and exposed to the atmosphere for about 48 hours. After this period, the untreated tolylene diisocyanates contained crystals suspended throughout the mass while the gel contained several crystals on the exposed surface thereof only.

(B) Stability to water

A similar comparison was made using bottles containing tolylene diisocyanates and the gel, to each of which about 5 parts of water was carefully flowed onto the surfaces. After about 24 hours, the tolylene diisocyanates contained white crystalline material suspended throughout the mass. The gel, on the other hand, contained a thin crust about ½ inch thick at the interface between the top of the gel and the layer of water as evidenced by the appearance of some embedded crystals.

(C) Reversibility of gel

A sample of the gel was warmed to 41° at which temperature it was completely fluid. On recooling to 31° it reverted to the gel form and at ambient temperature it could no longer be poured.

EXAMPLE 3

(A) Preparation of polyisocyanate gel

A mixture of 1000 parts of undistilled mixed toluene phosgenation product, having an amine equivalent 107.3, prepared as disclosed in U.S. Pat. 3,215,652, and parts of polyvinyl chloride (Vygen 65) was agitated and heated gently until a clear solution was obtained. The solution was cooled to ambient temperature and thick gel which was obtained was broken into Preparation of one-can compositions containing polyisocyanate gel and polyol 100 parts of the gel prepared in Part A above in an open top can and a mixture consisting of 100 parts of a sucrose-triethanolanolamine initiated polyol having a hydroxy number of 479
silicon oil surfactant (L–5310)
dimethyl ethanolamine
33% solution of triethylene diamine in glycol and;
chloromonofluoromethane in

EXAMPLE 5

(A) Preparation of polyisocyanate gel

A mixture of 79.3 parts of an 80%–20% mixture of 2,4- and 2,6-tolylene diisocyanates and 4.9 parts of polyvinyl chloride (Vygen 65) was heated and agitated on a hot plate until a clear solution resulted. The solution was permitted to cool by standing at ambient temperature and when cool formed a firm gel.

(B) Preparation of polyurethane using polyisocyanate gel of Part A

The gel prepared as described in Part A of this example was warmed to about 40° and poured into a rapidly agitated mixture consisting of 100 parts of a sucrose-triethanolamine initiated polyoxypropylene polyol having a hydroxyl-number of 479 (SA–460)
1.5 parts of silicone oil surfactant (L–5310)
0.5 part of N,N-dimethylethanolamine
1.0 part of a 33% solution of triethylene diamine in dipropylene glycol (Dabco 33–LV), and 40 parts of trichloromonofluoromethane (Genetron 11–SBA)

The mixture was agitated vigorously for about 15 seconds and then poured into a mold and allowed to expand and set to a rigid cellular urethane mass having a fine celled structure with a density of 1.93 lbs.

EXAMPLE 6

Preparation of one-can composition containing polyisocyanate gel and polyol; and preparation of polyurethane therefrom The procedure of Example 3 was repeated using parts of the polyisocyanate gel (containing of polyisocyanate and 5.7 parts covering it with polyol invention, it should be noted that variations in this preferred mode of operation are possible and many such variations will be obvious to those skilled in this art in view of the disclosures contained herein. Such variations are considered to be within the scope and spirit of our invention which is to be limited only by the claims appended hereto.

We claim:

1. A composition in non-flowable gel state which is stable at ambient temperature and which comprises organic polyisocyanate and polyvinyl chloride in an amount of about 3 to about 12 parts by weight per 100 parts by weight of said polyisocyanate.

2. A composition as defined in claim 1 wherein said organic polyisocyanate is tolylene diisocyanate.

3. A composition as defined in claim 1 wherein said organic polyisocyanate is undistilled toluene diamine phosgenation product having an amine equivalent between 98 and 120.

4. A method of preparing organic polyisocyanate in the form of a non-flowable gel which is stable at ambient temperature which comprises mixing said organic polyisocyanate with about 3 to 12 parts by weight polyvinyl chloride per 100 parts of said polyisocyanate at a temperature of about 30° C. to 60° C. and cooling said mixture to the gel state.

5. A method as defined in claim 4 wherein said polyisocyanate is tolylene diisocyanate.

6. A method as defined in claim 4 wherein said polyisocyanate is undistilled toluene diamine phosgenation product having an amine equivalent between 98 and 120.

7. A process for preparing a polyurethane composition comprising the steps of:
   (1) preparing a non-flowable polyisocyanate gel in a container by mixing an organic polyisocyanate with about 3 to 12 parts by weight of polyvinyl chloride per 100 parts by weight of said polyisocyanate; at a temperature of about 30° C. to 60° C. and cooling said mixture to the gel state;
   (2) adding to said gel with substantially no mixing therewith an active-hydrogen containing material selected from the group consisting of polyester polyols, polyalkylene ether polyols and polyamide polyols to form a two-phase mass;
   (3) storing said mass until ready for use;
   (4) agitating said two-phase mass to thoroughly mix the phases and to initiate reaction of the components thereof; and
   (5) allowing the thus formed mixture to react to form a polyurethane polymer.

8. A process as defined in claim 7 wherein said polyol is a polyalkylene ether polyol.

9. A process as defined in claim 8 wherein said polyol is combined in a polyether premix containing said polyol, catalyst and surfactant.

10. A process as claimed in claim 8 wherein said polyol is combined in a polyether premix containing polyurethane catalyst, silicone surfactant and a blowing agent.

11. A process as claimed in claim 7 wherein said polyisocyanate is tolylene diisocyanate.

12. A process as claimed in claim 7 wherein said polyisocyanate is undistilled toluene diamine phosgenation product having an amine equivalent between 98 and 120.

References Cited

UNITED STATES PATENTS

| | | | |
|---|---|---|---|
| 2,764,565 | 9/1956 | Hoppe et al. | 260—2.5 |
| 3,213,049 | 10/1965 | Heiss | 260—29.2 |
| 3,238,055 | 3/1966 | Brightwell | 117—65.2 |
| 3,238,056 | 3/1966 | Pall et al. | 117—98 |
| 3,245,942 | 4/1966 | Limperos | 260—32.8 |
| 3,348,963 | 10/1967 | Fukushima | 117—63 |
| 3,387,989 | 6/1968 | West et al. | 117—76 |
| 3,409,461 | 11/1968 | Mehlo et al. | 117—100 |

OTHER REFERENCES

Zimmerman and Lavine, Handbook of Material Trade-Names, Supp. II, Industrial Research Service, Inc., Dover, N.H. (1957), call No. TP15125, p. 240.

Condensed Chemical Dictionary, 5th ed., Reinhold, New York (1956), call No. QD5C5, p. 1165.

DONALD E. CZAJA, Primary Examiner

H. S. COCKERAM, Assistant Examiner

U.S. Cl. X.R.

260—77.5, 859